US012749376B2

(12) United States Patent
Sulzbacher

(10) Patent No.: US 12,749,376 B2
(45) Date of Patent: Sep. 29, 2026

(54) GAME WITH WIN BASED ON CRYPTOCURRENCY

(71) Applicant: IGT, Las Vegas, NV (US)

(72) Inventor: Helmut Sulzbacher, Eibiswald (AT)

(73) Assignee: IGT, Las Vegas, NV (US)

( * ) Notice: Subject to any disclaimer, the term of this patent is extended or adjusted under 35 U.S.C. 154(b) by 282 days.

(21) Appl. No.: 17/875,093

(22) Filed: Jul. 27, 2022

(65) Prior Publication Data

US 2024/0038022 A1 Feb. 1, 2024

(51) Int. Cl.
*G07F 17/32* (2006.01)
*G06Q 50/34* (2012.01)

(52) U.S. Cl.
CPC ......... *G07F 17/3258* (2013.01); *G06Q 50/34* (2013.01); *G07F 17/3223* (2013.01); *G06Q 2220/00* (2013.01); *G07F 17/3239* (2013.01)

(58) Field of Classification Search
CPC ............. G07F 17/3258; G07F 17/3225; G07F 17/3244
See application file for complete search history.

(56) References Cited

U.S. PATENT DOCUMENTS 10,885,740 B2 * 1/2021 Higgins ............... G06Q 20/065
12,118,580 B2 * 10/2024 Kim ................... G06Q 30/0216
2006/0040725 A1 * 2/2006 Walker ................ G07F 17/3244 463/16
2013/0065670 A1 * 3/2013 Michaelson ....... G06Q 20/0655 463/25
2013/0084966 A1 * 4/2013 Nicely ................ G07F 17/3258 463/43
2014/0087855 A1 * 3/2014 Caputo ............... G07F 17/3225 463/26
2014/0370969 A1 * 12/2014 LeMay ............... G07F 17/3211 463/25
2015/0287276 A1 * 10/2015 Humphrey .......... G07F 17/3225 463/31
2018/0040195 A1 * 2/2018 Moro .................. G07F 17/3267

(Continued)

OTHER PUBLICATIONS

How to Create a Guarantee on BitLine, https://www.youtube.com/watch?v=oWs_wzLKTcw, Uploaded on Sep. 26, 2021, Bitline, Run-Time 3:15, 10 pages.

(Continued)

*Primary Examiner* — Chase E Leichliter
(74) *Attorney, Agent, or Firm* — Sheridan Ross P.C.

(57) ABSTRACT

Provided are systems, devices and methods for awarding a cryptocurrency responsive to a win on a wagering game. Operations include causing a first currency amount of a first currency to be purchased using a second currency that is different from the first currency, the first currency comprising a cryptocurrency that is maintained using a decentralized distributed management architecture. Operations include recording a second currency amount that corresponds to the first currency amount that was purchased using the second currency and allocating a first portion of the first currency amount to a gaming machine that is caused to generate a wagering game. Operations include determining a remaining amount of the first currency after the first portion of the first currency amount has been allocated and comparing the remaining amount of the first currency to a first currency threshold.

12 Claims, 10 Drawing Sheets

(56) References Cited

U.S. PATENT DOCUMENTS

| | | | | |
|---|---|---|---|---|
| 2020/0152005 | A1* | 5/2020 | Higgins | G07F 17/3244 |
| 2020/0342479 | A1* | 10/2020 | Buck | H04L 9/0643 |
| 2021/0086084 | A1* | 3/2021 | Yi | G06Q 20/065 |
| 2022/0374874 | A1* | 11/2022 | Irwin, Jr. | G06Q 20/3829 |
| 2023/0055064 | A1* | 2/2023 | Dalmia | G06Q 50/34 |
| 2023/0064949 | A1* | 3/2023 | Higgins | G07F 17/3258 |
| 2023/0130583 | A1* | 4/2023 | Shaffer, Jr. | G07F 17/3241 463/26 |
| 2023/0201725 | A1* | 6/2023 | Dalmia | G07F 17/3227 463/40 |
| 2023/0298435 | A1* | 9/2023 | Dalmia | G07F 17/3241 463/42 |
| 2024/0038022 | A1* | 2/2024 | Sulzbacher | G07F 17/3244 |

OTHER PUBLICATIONS

Introducing BitLine, https://www.youtube.com/watch?v=9hq19AgyupU, Uploaded on Sep. 27, 2021, BitLine, Run-Time 2:38, 17 pages.

How to Use the BitLine App, https://www.youtube.com/watch?v=2GE-1xic4as, Uploaded on Sep. 26, 2021, Bitline, Run-Time 2:20, 11 pages.

* cited by examiner

GAME WITH WIN BASED ON CRYPTOCURRENCY

BACKGROUND OF THE DISCLOSURE

Gaming machines my provide players wards in primary games. Gaming machines generally require the player to place a wager to activate the primary game. The award may be based on the player obtaining a winning symbol or symbol combination and on the amount of the wager.

BRIEF SUMMARY OF THE DISCLOSURE

Some embodiments are directed to a system for providing a win that includes an award based on cryptocurrency according to some embodiments. In some embodiments, operations may be performed in a system that includes a gaming establishment component processor and a gaming establishment component memory device. In some embodiments, the gaming establishment component memory device stores multiple instructions, which when executed by the gaming establishment component processor, cause the gaming establishment component processor to perform operations disclosed herein. Operations include causing a first currency amount of a first currency to be purchased using a second currency that is different from the first currency and recording a second currency amount that corresponds to the first currency amount that was purchased using the second currency. Operations further include and allocating a first portion of the first currency amount to a gaming machine that is caused to generate a wagering game.

Some embodiments are directed to methods that include operations. Such operations may include causing a first currency amount of a first currency to be purchased using a second currency that is different from the first currency and recording a second currency amount that corresponds to the first currency amount that was purchased using the second currency.

Operations further include allocating a first portion of the first currency amount to a gaming machine that is caused to generate a wagering game. In some embodiments, operations include recording a date and time corresponding to the second currency amount that corresponds to the first currency amount that was purchased using the second currency.

In some embodiments, the first currency is a cryptocurrency that is maintained using a decentralized distributed management architecture. Some embodiments provide that the second currency is a fiat currency issue by a centralized banking system. For example, the first currency may be a cryptocurrency such as Bitcoin and/or Ethereum, among others. However, the cryptocurrency is not limited to Bitcoin and/or Ethereum. In some embodiments, the second currency is a government issued currency such as the US Dollar, Canadian Dollar, and/or the Euro, among others.

Operations include determining a remaining amount of the first currency after the first portion of the first currency amount has been allocated and comparing the remaining amount of the first currency to a first currency threshold. In response to the remaining amount of the first currency being less than the first currency threshold, operations include determining to purchase an additional first currency amount.

Some embodiments are directed to gaming devices that include a communication interface, a processor circuit and a memory coupled to the processor circuit. The memory includes machine readable instructions that, when executed by the processor circuit, cause the processor circuit to perform operations as disclosed herein. Operations include causing a first currency amount of a first currency to be purchased using a second currency that is different from the first currency and recording a second currency amount that corresponds to the first currency amount that was purchased using the second currency. Operations include allocating a first portion of the first currency amount to a gaming machine that is caused to generate a wagering game and providing a symbol driven jackpot at the gaming machine. In some embodiments, a win corresponding to the symbol driven jackpot includes the first portion of the first currency amount and is provided in the cryptocurrency. Operations include determining a first portion of the second currency amount that corresponds to the first portion of the first currency and determining a symbol combination that corresponds to a win of the symbol driven jackpot. Operations include determining multiple symbol combinations that cause the win of the symbol driven jackpot.

DETAILED DESCRIPTION OF THE DISCLOSURE

Embodiments provided herein may include another element of volatility to the experience. For example, some embodiments may denominate one or more award values in one or more cryptocurrencies. A fiat representation of the award value(s) may then fluctuate based upon more variables than what players encounter in the field. For example, values may fluctuate based on contributions from play, hits and fluctuations in the underlying value of the cryptocurrency(s).

Such an increase in volatility can be leveraged by new game themes that accentuate and emphasize use of cryptocurrency denominated awards. This can be especially valuable to casino operators when particular cryptocurrencies are popular and are gathering media attention.

In some embodiments, a player may play a wagering game on a game that results in a win. In some embodiments, the win may be denominated in and/or include one or more cryptocurrencies. Once the cryptocurrency award is won by the player, a ticket may be issued may be issued to the player to obtain the cryptocurrency at any of multiple different redemption sites. A redemption site may be provided by a casino operator, a casino equipment provider and/or an entity that is not related to the casino or casino equipment provider.

In some embodiments, the cryptocurrency win may be applied to a single EGM and/or to multiple linked EGMs in a local and/or wide area environment or within an online casino. In some embodiments, the cryptocurrency win may be won with a Mystery jackpot application and/or by a symbol driven jackpot application.

Some embodiments provide that when applied to an online casino, the cryptocurrency Jackpot displays in real time its respective currency value (e.g.: $). In some embodiments, this may also be applied to any type of operations with an appropriate web communication.

Figure 1:
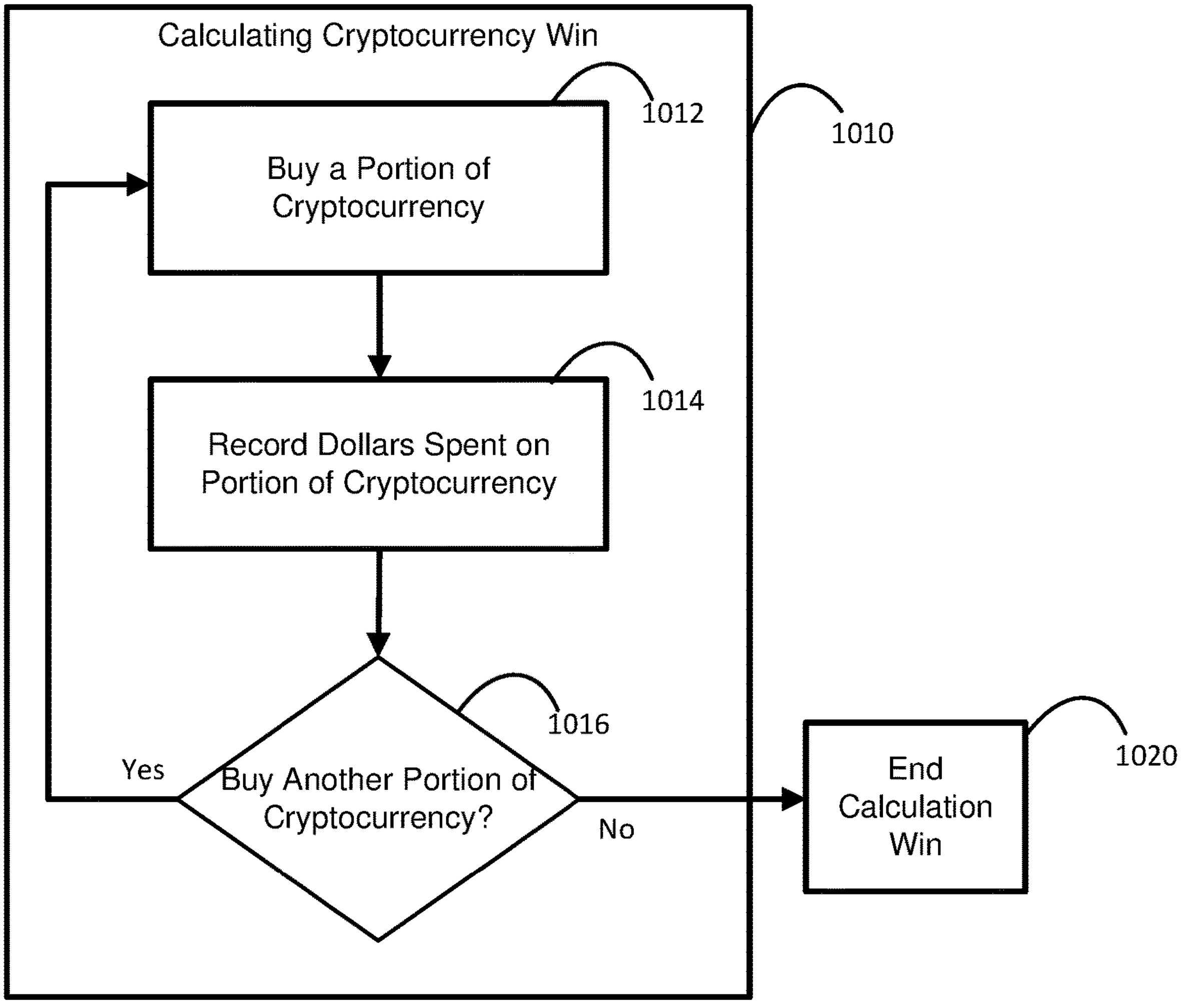
FIG. 1 is a schematic block diagram illustrating operations for calculating cryptocurrency win according to some embodiments.

Brief reference is now made to FIG. 1, which is a schematic block diagram that illustrates calculating (block 1010) a cryptocurrency win according to some embodiments. In some embodiments, a cryptocurrency win may be calculated by having the casino and/or casino equipment operator purchase (block 1012) a portion of the cryptocurrency. The purchased amount of dollars spent for each portion of the cryptocurrency is recorded (block 1014) and the purchased portion of cryptocurrency is saved for future use cases.

Figure 2:
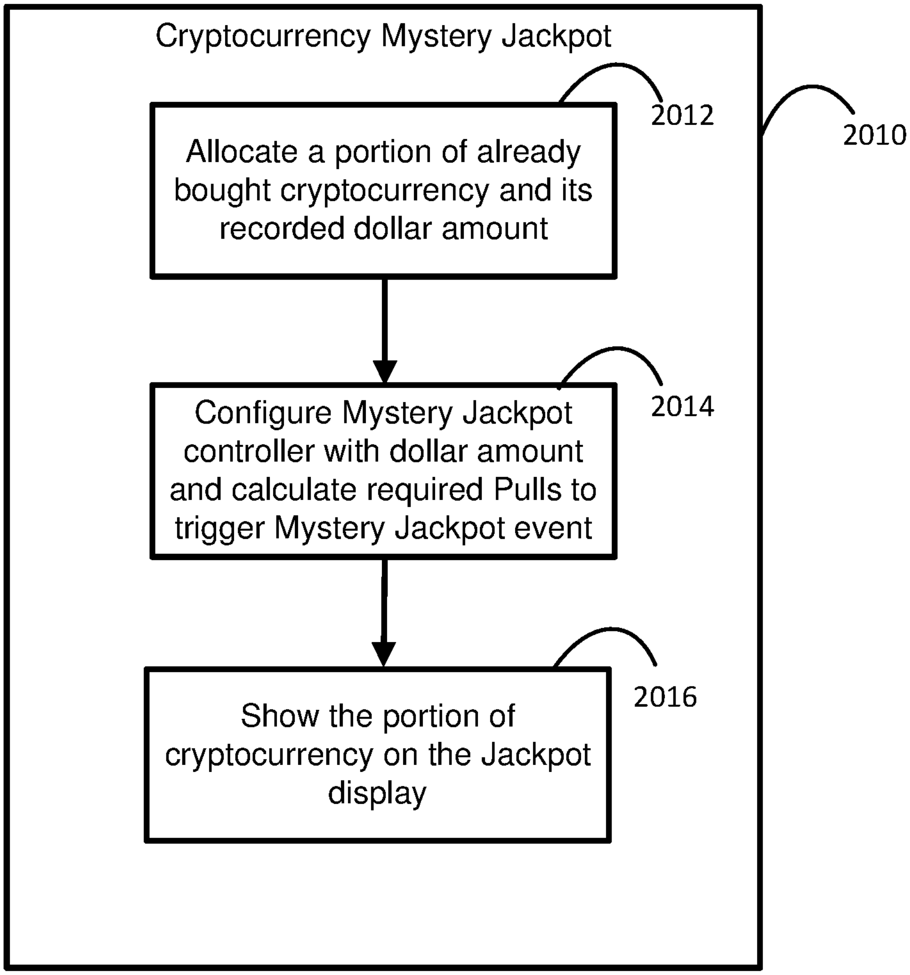
FIG. 2 is a schematic block diagram illustrating operations for providing a cryptocurrency win in a cryptocurrency mystery jackpot according to some embodiments.

Brief reference is now made to FIG. 2, which is a schematic block diagram illustrating operations for providing (block 2010) a cryptocurrency win in a cryptocurrency mystery jackpot according to some embodiments. Some embodiments provide that a mystery jackpot application may be established by allocating (block 2012) the portion of already bought cryptocurrency and its recorded dollar amount. A mystery jackpot controller may be setup (block 2014) in synch with the recorded dollar amount to trigger the cryptocurrency win. In some embodiments, the jackpot display (block 2016) may show the number of cryptocurrency units that the player may win.

Figure 3:
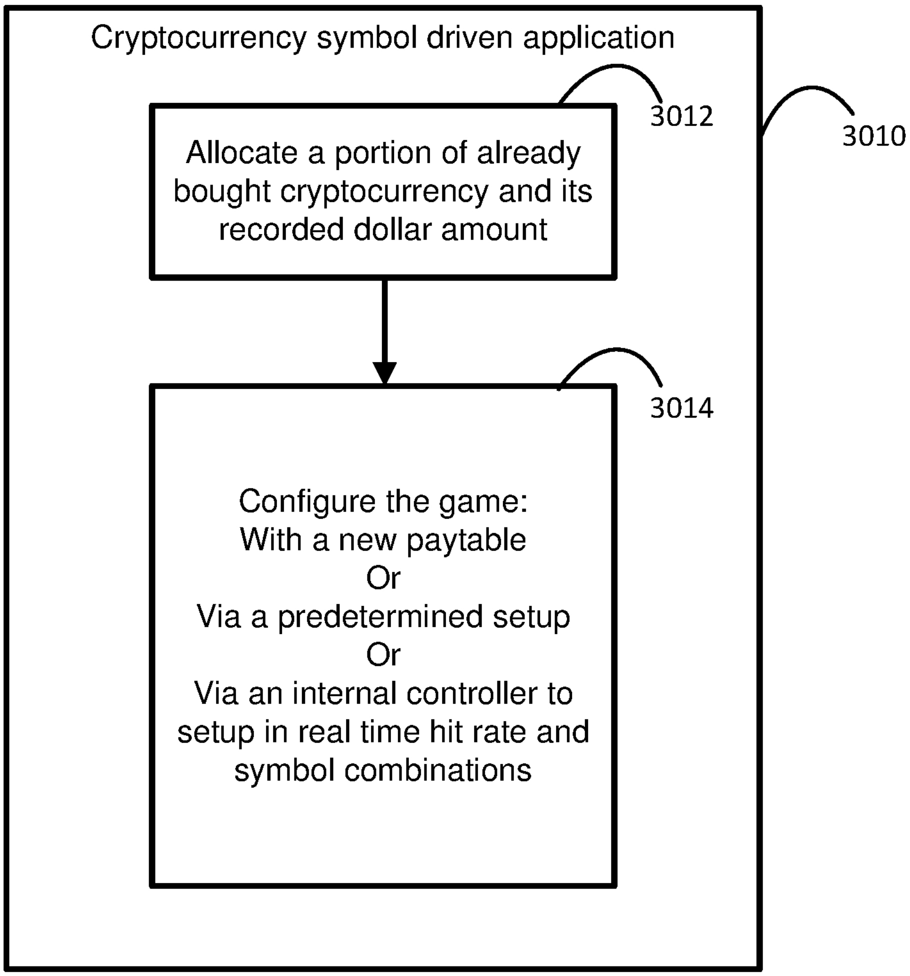
FIG. 3 is a schematic block diagram illustrating operations for providing a cryptocurrency symbol driven win according to some embodiments.

Brief reference is now made to FIG. 3, which is a schematic block diagram illustrating operations (block 3010) for providing a cryptocurrency symbol driven win according to some embodiments. In some embodiments, a symbol driven jackpot application may be established by allocating (block 3012) a portion of already purchased cryptocurrency and its recorded dollar amount corresponding to the allocated portion. In some embodiments, the game is configured (block 3014) with respect to the number of pulls to hit by a new to be developed configuration (e.g., a new paytable), a predetermined configuration and/or an internal controller to configure in real time hit rate and the required symbol combinations to hit.

Figure 4:
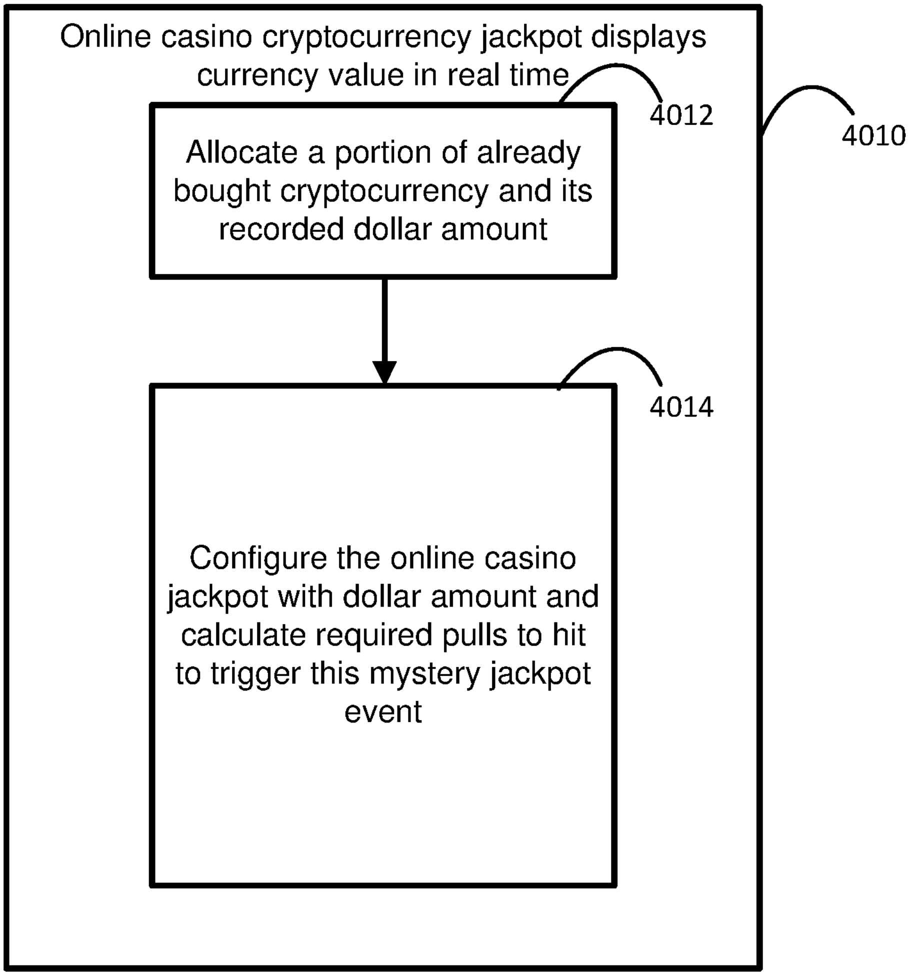
FIG. 4 is a schematic block diagram illustrating operations for providing online casino cryptocurrency jackpot that displays currency value in real time according to some embodiments.

Brief reference is now made to FIG. 4, which is a schematic block diagram illustrating operations for providing online casino cryptocurrency jackpot (block 4010) that displays currency value in real time according to some embodiments. In some embodiments, a symbol driven jackpot application may be established by allocating (block 3012) a portion of already purchased cryptocurrency and its recorded dollar amount corresponding to the allocated portion. Operations may include configuring (block 4014) the online casino jackpot with dollar amount and calculate required pulls to hit to trigger this mystery jackpot event.

Figure 5:
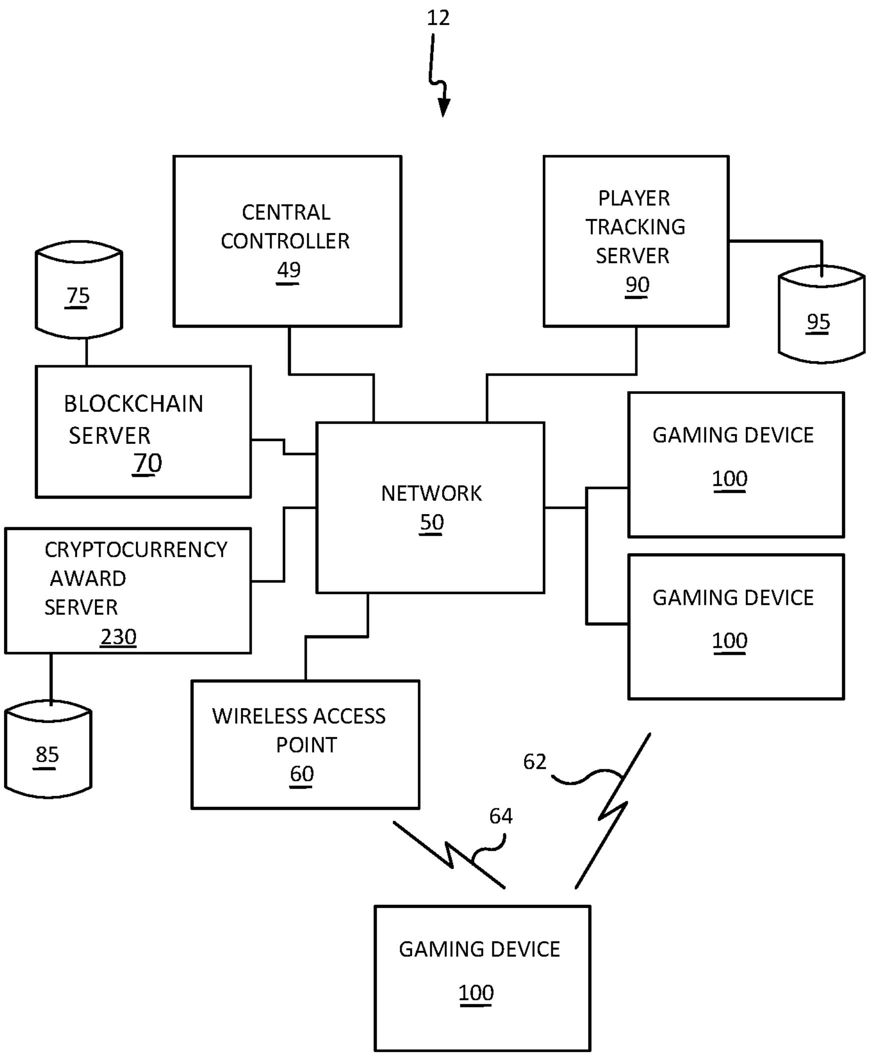
FIG. 5 illustrates a casino management system including a plurality of gaming devices according to some embodiments herein.

Reference is now made to FIG. 5, which illustrates a casino management system 12 including a plurality of gaming devices 100 according to some embodiments herein. The casino management system 12 may be located, for example, on the premises of a gaming establishment, such as a casino, in a private residence, or may include components that are located at different locations. The gaming devices 100 may be in communication with each other and/or a central controller 49 through a data communication network 50, or remote communication link. The data communication network 50 may be a private data communication network that is operated, for example, by the gaming facility that operates the gaming device 100, a publicly accessible data communication network such as the Internet, or a combination thereof. Communications over the data communication network 50 may be encrypted for security. The central controller 49 may be any suitable server or computing device which includes at least one processor circuit, such as a processor, and at least one memory or storage device. Each gaming device 100 may include a processor circuit that transmits and receives events, messages, commands or any other suitable data or signal between the gaming device 100 and the central controller 49 and/or other gaming devices 100. The gaming device processor is operable to execute such communicated events, messages or commands in conjunction with the operation of the gaming device 100. Moreover, the processor of the central controller 49 is configured to transmit and receive events, messages, commands or any other suitable data or signal between the central controller 49 and each of the individual gaming devices 100. In some embodiments, one or more of the functions of the central controller 49 may be performed by one or more gaming device processors. Moreover, in some embodiments, one or more of the functions of one or more gaming device processors as disclosed herein may be performed by the central controller 49.

A wireless access point 60 provides wireless access to the data communication network 50. The wireless access point 60 may be connected to the data communication network 50 as illustrated in FIG. 15 or may be connected directly to the central controller 49 or another server connected to the data communication network 50.

One or more servers, such as a player credit server 80, may also be connected through the data communication network 50. Similarly, the gaming content server 80 may manage delivery of the gaming content to the user of a gaming device 100. The gaming content may be stored in a gaming content database 85. A blockchain server 70 may manage access, update, storage, consensus determination, and/or cryptocurrency denominated progressive status. The blockchain data may be stored in a blockchain database 75. The blockchain server 70 and a player credit server 80 may be implemented within or separately from each other. The blockchain server 70 and a cryptocurrency award server 230 may also be implemented within or separately from the central controller 49.

A player tracking server 90 may also be connected through the data communication network 50. The player tracking server 90 may manage a player tracking account that tracks the gameplay and spending and/or other player preferences and customizations of a player, i.e., the user of the gaming device 100, manages loyalty awards for the player, manages funds deposited or advanced on behalf of the player, and other functions. Player information managed by the player tracking server 90 may be stored in a player information database 95. In some embodiments, the player information database 95 and/or the player tracking server 90 may include and/or provide information that may be used by the blockchain server 70 to detect excluded players. For example, data corresponding to an excluded player may be received responsive to the excluded player submitting and/or inserting a player tracking card to a gaming table or machine.

The gaming devices 100 communicate with one or more elements of the system 12 to coordinate providing streaming video content and synchronized gaming content. For example, in some embodiments, a gaming device 100 may communicate directly with another gaming device 100 over a wireless interface 62, which may be a WiFi link, a Bluetooth link, an NFC link, etc. In other embodiments, the gaming device 100 may communicate with the data communication network 50 (and devices connected thereto, including EGMs) over a wireless interface 64 with the wireless access point 60. The wireless interface 64 may include a WiFi link, a Bluetooth link, an NFC link, etc. In still further embodiments, the gaming device 100 may communicate with other gaming devices 100 or other devices over the wireless interface 62 and the wireless access point 60 over the wireless interface 64. In these embodiments, the wireless interface 62 and the wireless interface 64 may use different communication protocols and/or different communication resources, such as different frequencies, time slots, spreading codes, etc. For example, in some embodiments, the wireless interface 62 may be a Bluetooth link, while the wireless interface 64 may be a WiFi link.

The wireless interfaces 62, 64 allow the gaming devices 100 and/or central controller 49 to coordinate providing player data from gaming devices 100.

Figure 6:
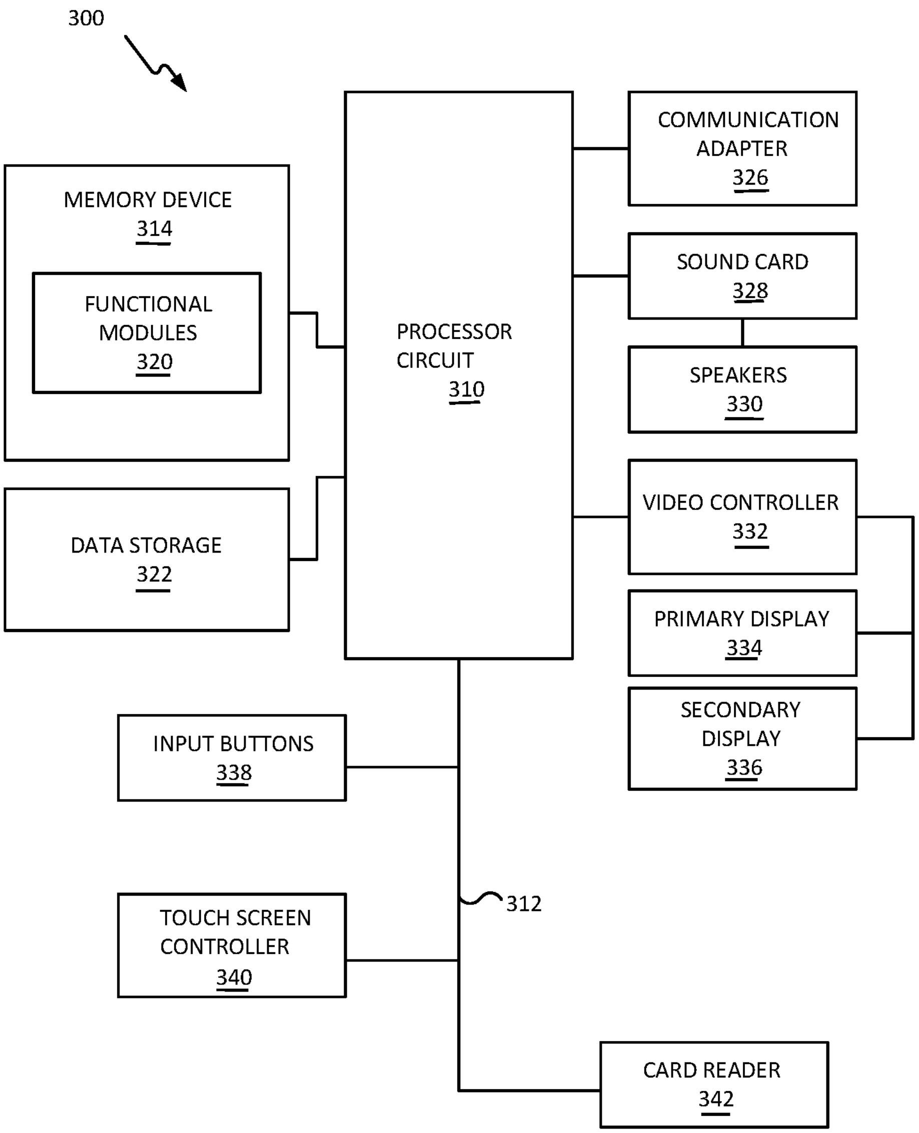
FIG. 6 is a block diagram that illustrates various components of a computing device, which may embody or be included as part of the devices, systems, and/or components above, according to some embodiments.

Reference is now to FIG. 6, which is a block diagram that illustrates various components of a computing device 300, which may embody or be included as part of the devices, systems, and/or components above, according to some embodiments. As shown in FIG. 15, the computing device 300 may include a processor circuit 310 that controls operations of the computing device 300. Although illustrated as a single processor, multiple special purpose and/or general-purpose processors and/or processor cores may be provided in the computing device 300. For example, the computing device 300 may include one or more of a video processor, a signal processor, a sound processor and/or a communication controller that performs one or more control functions within the computing device 300. The processor circuit 310 may be variously referred to as a "controller," "microcontroller," "microprocessor" or simply a "computer." The processor circuit 310 may further include one or more application-specific integrated circuits (ASICs).

Various components of the computing device 300 are illustrated in FIG. 15 as being connected to the processor circuit 310. It will be appreciated that the components may be connected to the processor circuit 310 and/or each other through one or more buses 312 including a system bus, a communication bus and controller, such as a USB controller and USB bus, a network interface, or any other suitable type of connection.

The computing device 300 further includes a memory device 314 that stores one or more functional modules 320 for performing the operations described above. Alternatively, or in addition, some of the operations described above may be performed by other devices connected to the network, such as the network 50 of the peer-to-peer wagering system 12 of FIG. 2, for example. The computing device 300 may communicate with other devices connected to the network to facilitate performance of some of these operations. For example, the computing device 300 may communicate and coordinate with certain displays to identify elements of a race being displayed by a particular display.

The memory device 314 may store program code and instructions, executable by the processor circuit 310, to control the computing device 300. The memory device 314 may include random access memory (RAM), which can include non-volatile RAM (NVRAM), magnetic RAM (ARAM), ferroelectric RAM (FeRAM) and other forms as commonly understood in the gaming industry. In some embodiments, the memory device 314 may include read only memory (ROM). In some embodiments, the memory device 314 may include flash memory and/or EEPROM (electrically erasable programmable read only memory). Any other suitable magnetic, optical and/or semiconductor memory may operate in conjunction with the gaming device disclosed herein.

The computing device 300 may include a communication adapter 326 that enables the computing device 300 to communicate with remote devices, such as the wireless network, another computing device 300, and/or a wireless access point, over a wired and/or wireless communication network, such as a local area network (LAN), wide area network (WAN), cellular communication network, or other data communication network, e.g., the network 50 of FIG. 5.

The computing device 300 may include one or more internal or external communication ports that enable the processor circuit 310 to communicate with and to operate with internal or external peripheral devices, such as a sound card 328 and speakers 330, video controllers 332, a primary display 334, a secondary display 336, input buttons 338 or other devices such as switches, keyboards, pointer devices, and/or keypads, a touch screen controller 340, a card reader 342, currency acceptors and/or dispensers, cameras, sensors such as motion sensors, mass storage devices, microphones, haptic feedback devices, and/or wireless communication devices. In some embodiments, internal or external peripheral devices may communicate with the processor through a universal serial bus (USB) hub (not shown) connected to the processor circuit 310. Although illustrated as being integrated with the computing device 300, any of the components therein may be external to the computing device 300 and may be communicatively coupled thereto. Although not illustrated, the computing device 300 may further include a rechargeable and/or replaceable power device and/or power connection to a main power supply, such as a building power supply.

Figure 7:
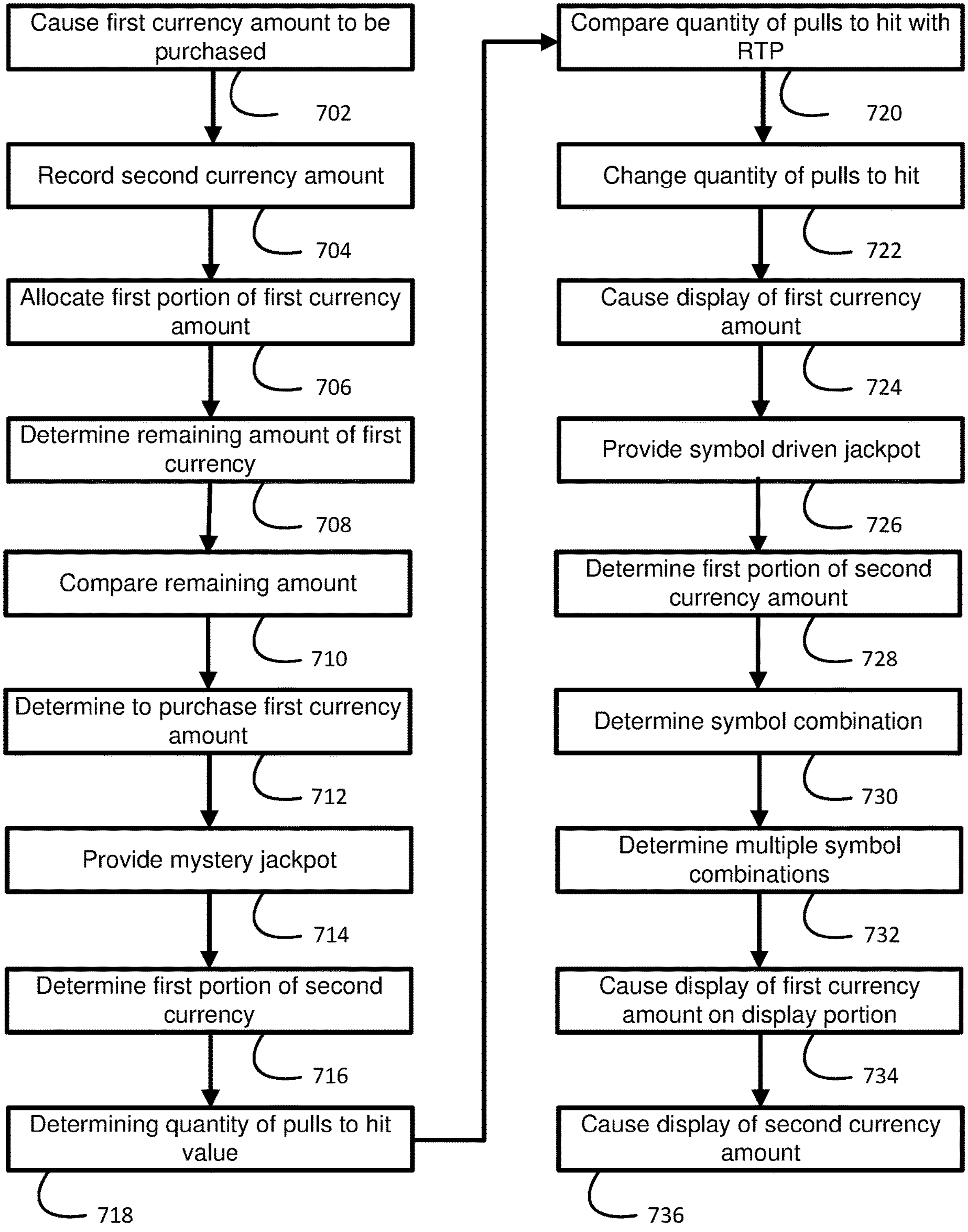
FIG. 7 is a schematic flow diagram illustrating operations of a system for providing a win that includes an award based on cryptocurrency according to some embodiments.

Reference is now made to FIG. 7, which is a schematic flow diagram illustrating operations of a system for providing a win that includes an award based on cryptocurrency according to some embodiments. In some embodiments, operations may be performed in a system that includes a gaming establishment component processor and a gaming establishment component memory device. In some embodiments, the gaming establishment component memory device stores multiple instructions, which when executed by the gaming establishment component processor, cause the gaming establishment component processor to perform operations disclosed herein.

Operations include causing (block 702) a first currency amount of a first currency to be purchased using a second currency that is different from the first currency and recording (block 704) a second currency amount that corresponds to the first currency amount that was purchased using the second currency.

Operations further include allocating (block 706) a first portion of the first currency amount to a gaming machine that is caused to generate a wagering game. In some embodiments, operations include recording a date and time corresponding to the second currency amount that corresponds to the first currency amount that was purchased using the second currency.

In some embodiments, the first currency is a cryptocurrency that is maintained using a decentralized distributed management architecture. Some embodiments provide that the second currency is a fiat currency issue by a centralized banking system. For example, the first currency may be a cryptocurrency such as Bitcoin and/or Ethereum, among others. However, the cryptocurrency is not limited to Bitcoin and/or Ethereum. In some embodiments, the second currency is a government issued currency such as the US Dollar, Canadian Dollar, and/or the Euro, among others.

Operations include determining (block 708) a remaining amount of the first currency after the first portion of the first currency amount has been allocated and comparing (block 710) the remaining amount of the first currency to a first currency threshold. In response to the remaining amount of the first currency being less than the first currency threshold, operations include determining (block 712) to purchase an additional first currency amount. In some embodiments, the first currency threshold is based on an amount of the first currency that is maintained for awarding future cryptocurrency prizes based on wins.

In some embodiments, operations include providing (block 714) a mystery jackpot at the gaming machine after playing the wagering game. Some embodiments provide that a win corresponding to the mystery jackpot includes the first portion of the first currency amount and is provided in the cryptocurrency.

Operations may include determining (block 716) a first portion of the second currency amount that corresponds to the first portion of the first currency and determining (block 718) a quantity of pulls to hit value that is determined based on the first portion of the second currency amount. Operations may further include comparing (720) the quantity of pulls to hit with a return to player metric. In response to determining that the quantity of pulls to hit results is not satisfying the return to player metric, operations may include changing (block 722) the quantity of pulls to hit to satisfy the return to player metric. In this manner, the gaming device may satisfy the return to play metric even if the monetary value of the first currency changes.

In some embodiments, operations include causing (block 724) a display of the first currency amount on a display portion that corresponds to the mystery jackpot.

In some embodiments, operations include providing (block 726) a symbol driven jackpot at the gaming machine. In such embodiments, a win corresponding to the symbol driven jackpot includes the first portion of the first currency amount and is provided in the cryptocurrency. In some embodiments, operations include determining (block 728) a first portion of the second currency amount that corresponds to the first portion of the first currency and determining (block 730) a symbol combination that corresponds to a win of the symbol driven jackpot. Some embodiments provide that operations include determining (block 730) multiple symbol combinations that cause the win of the symbol driven jackpot. In such embodiments, multiple different combinations of symbols may be the basis for triggering a win that is denominated in the first currency. Some embodiments provide that operations include causing (block 734) a display of the first currency amount on a display portion that corresponds to the symbol driven jackpot.

In some embodiments, the gaming machine is a mobile device that includes a display that displays the first portion of the first currency amount to the mobile device that is caused to generate the wagering game. In some embodiments, the display is further caused to display (block 736) the second currency amount that corresponds to the first currency amount that was purchased using the second currency.

Figure 8:
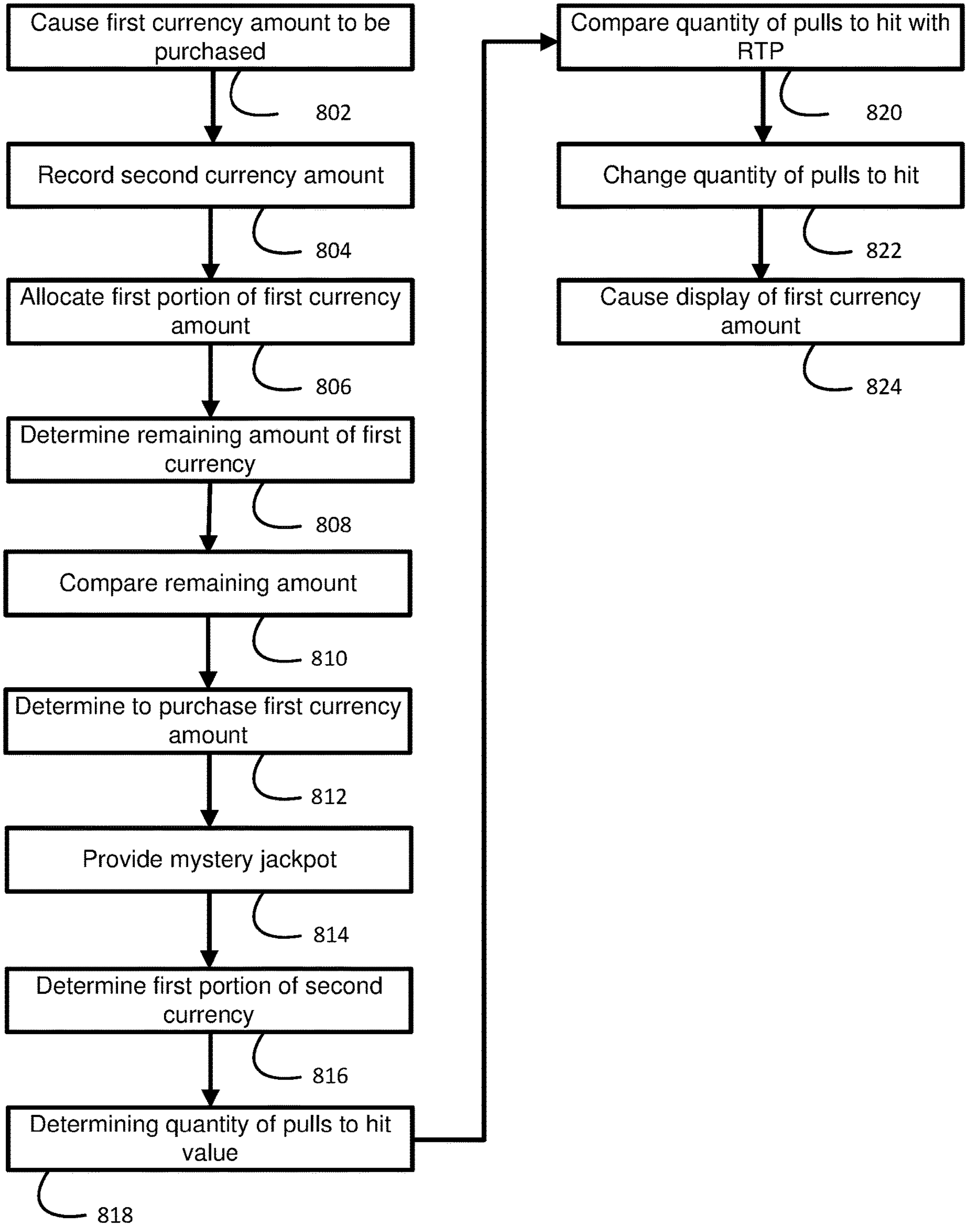
FIG. 8 is a schematic flow diagram illustrating operations of a system for providing a win that includes an award based on cryptocurrency according to some embodiments.

Reference is now made to FIG. 8, which is a schematic flow diagram illustrating operations of methods for providing a win that includes an award based on cryptocurrency according to some embodiments.

In some embodiments, operations according to such methods may include operations of causing (block 802) a first currency amount of a first currency to be purchased using a second currency that is different from the first currency and recording (block 804) a second currency amount that corresponds to the first currency amount that was purchased using the second currency.

Operations further include allocating (block 806) a first portion of the first currency amount to a gaming machine that is caused to generate a wagering game. In some embodiments, operations include recording a date and time corresponding to the second currency amount that corresponds to the first currency amount that was purchased using the second currency.

In some embodiments, the first currency is a cryptocurrency that is maintained using a decentralized distributed management architecture. Some embodiments provide that the second currency is a fiat currency issue by a centralized banking system. For example, the first currency may be a cryptocurrency such as Bitcoin and/or Ethereum, among others. However, the cryptocurrency is not limited to Bitcoin and/or Ethereum. In some embodiments, the second currency is a government issued currency such as the US Dollar, Canadian Dollar, and/or the Euro, among others.

Operations include determining (block 808) a remaining amount of the first currency after the first portion of the first currency amount has been allocated and comparing (block 810) the remaining amount of the first currency to a first currency threshold. In response to the remaining amount of the first currency being less than the first currency threshold, operations include determining (block 812) to purchase an additional first currency amount.

Operations include providing (block 814) a mystery jackpot at the gaming machine after playing the wagering game. In some embodiments, a win corresponding to the mystery jackpot includes the first portion of the first currency amount and is provided in the cryptocurrency. Operations may further include determining (block 816) a first portion of the second currency amount that corresponds to the first portion of the first currency and determining (block 818) a quantity of pulls to hit value that is determined based on the first portion of the second currency amount. Embodiments may include comparing the quantity of pulls to hit by comparing (block 820) the quantity of pulls to hit with a return to player metric. In response to responsive to determining that the quantity of pulls to hit results in not satisfying the return to player metric, changing (block 822) the quantity of pulls to hit to satisfy the return to player metric.

In some embodiments, operations include displaying (block 824) the first currency amount on a display portion that corresponds to the mystery jackpot.

Figure 9:
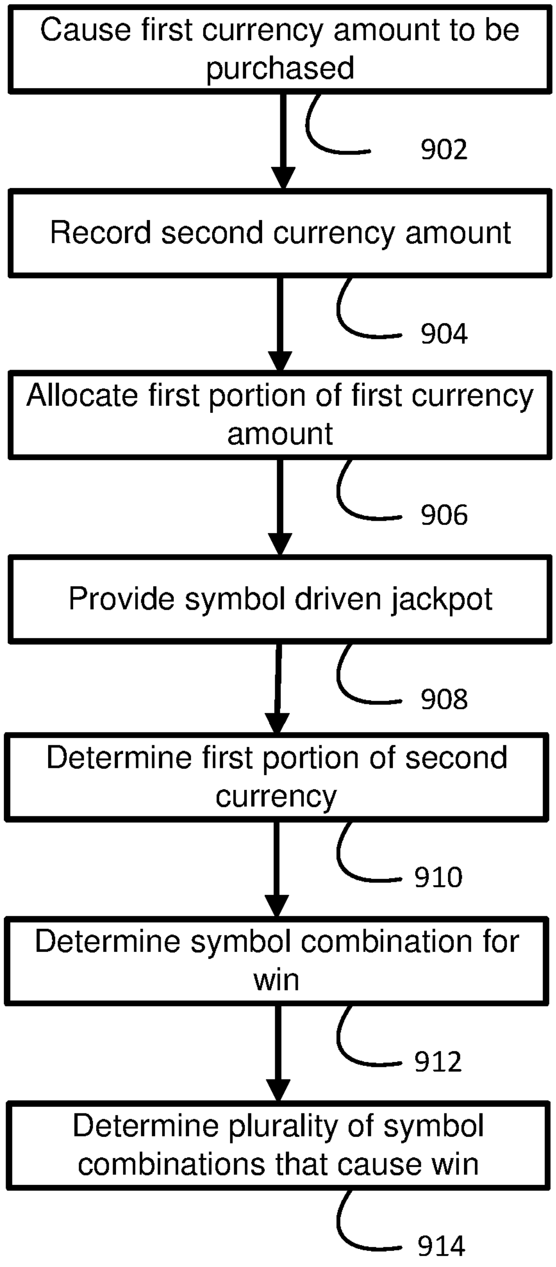
FIG. 9 is a schematic flow diagram illustrating operations of a gaming device for providing a win that includes an award based on cryptocurrency according to some embodiments.

Reference is now made to FIG. 9, which is a schematic flow diagram illustrating operations of a gaming device for providing a win that includes an award based on cryptocurrency according to some embodiments. The gaming device may include a communication interface, a processor circuit, and a memory coupled to the processor circuit. The memory includes machine readable instructions that, when executed by the processor circuit, cause the processor circuit to perform operations disclosed herein. Operations include causing (block 902) a first currency amount of a first currency to be purchased using a second currency that is different from the first currency and recording (block 904) a second currency amount that corresponds to the first currency amount that was purchased using the second currency. Operations include allocating (block 906) a first portion of the first currency amount to a gaming machine that is caused to generate a wagering game and providing (block 908) a symbol driven jackpot at the gaming machine. In some embodiments, a win corresponding to the symbol driven jackpot includes the first portion of the first currency amount and is provided in the cryptocurrency. Operations include determining (block 910) a first portion of the second currency amount that corresponds to the first portion of the first currency and determining (block 912) a symbol combination that corresponds to a win of the symbol driven jackpot. Operations include determining (block 914) multiple symbol combinations that cause the win of the symbol driven jackpot.

Figure 10:
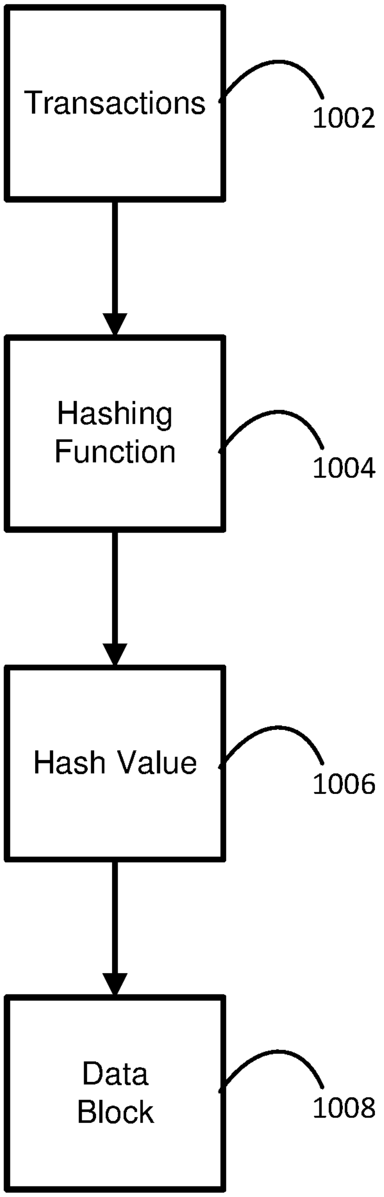
FIG. 10 is a schematic block diagram illustrating various operations for a blockchain transaction recordation according to some embodiments

Reference is now made to FIG. 10, which is a schematic block diagram illustrating various operations for a blockchain transaction recordation according to some embodiments. As illustrated in FIG. 10, transactions 1002 are occurring at various gaming casinos. In accordance with various embodiments, a hash may be created for each entry. For example, a cryptographic hash function may create a one-way, (essentially) collision free signature of the entry. The hash algorithm generates a hash. Using hashing function 1004, hash values 1006 are created of these transactions which are then added to data blocks 1008 that are in the blockchain.

As a general principle, a validation process may be performed to ensure that the new data block meets the criteria for inclusion into the blockchain. In a blockchain configuration, there are varying consensus algorithms that can be used. For example, a private blockchain may choose an algorithm such as Practical Byzantine Fault Tolerance (PBFT). The PBFT mechanism may be useful for small networks, such as networks having fewer than about 100 nodes. other examples include a proof of work (pow) consensus algorithm and/or a proof of stake (pos) consensus algorithm, which may be used as the value of an underlying data block and/or value changes.

In some embodiments, an EGM, service window, SMIB, player mobile device and/or signage can indicate the current exchange rate values including the fiat pools. The signage and/or other display devices can indicate when conversion from fiat to cryptocurrency happens and celebrate the conversion as a positive event. For example, a fireworks explosion could be shown (with audio) when the conversion happens. The signage can also show the current fiat to cryptocurrency conversion rate(s). The signage can indicate when a conversion is likely to happen next, such as in about 2 minutes, if Bitcoin changes in value a little more, or when the next game/system event triggers the conversion.

Responsive to a player wining a jackpot denominated in cryptocurrency, the player may be paid in the cryptocurrency that they have won. In the case of a traditional progressive jackpot, the casino and/or system operator may be provided with a written check, a bank transfer and/or other form of legal tender. In the case of a player winning a cryptocurrency based award, a variety of options may be used. For example, in some embodiments, a player may be paid by converting the cryptocurrency to cash and paying the remaining amount (after fees) using the traditional payment mechanisms. Some embodiments provide that the player may be paid by transferring the cryptocurrency to the player's chosen external crypto wallet using a transfer on a blockchain. Some embodiments include transferring the cryptocurrency to a crypto wallet of the player's casino resort wallet.

Embodiments herein may include requisite gaming device and jackpot verification procedures as required by the gaming jurisdiction and/or internal controls of the casino and that may have occurred prior initiating a process of paying the player.

In some embodiments, the player may be paid in fiat currency using the current cryptocurrency to fiat conversion rate minus applicable fees. The amount remaining may be paid to the player directly (in cash), by check, or by electronic transfer to the player's bank account (ACH, etc). This type of conversion may offer the casino and/or wide area progressive system operator to impose additional fees beyond what they may have to pay for the cryptocurrency to fiat conversion. In some embodiments, the operator and/or wide area system operator may pay any capital gains taxes that have occurred during the period when the cryptocurrency was originally purchased and the time when it was sold. Some embodiments provide that the exchange cryptocurrency management system can track the original purchase price and the sale price associated with each segment of cryptocurrency and may provide reporting to the casino operator so that the proper amount of taxes can be withheld from the payment to the player and for accounting purposes.

The above example is non-limiting and thus not exhaustive. In some embodiments, the player's jackpot amount could be a combination of the cryptocurrency amount held in the pool plus the fiat value remaining in the escrow pool for the winning levels the player hit.

In some embodiments, the winning amount can be converted to fiat and deposited into the player's cashless wagering account (Resort Wallet, etc.)

In some embodiments, the amount paid to the player in cash may be a subset (ex: 50%) of the amount won when they take the amount in cash. Such embodiments may be applicable to jackpots won for wide area progressive wins in which the player is given an option to get a 50% cash payout today or get paid using an annuity over 30 years.

In some embodiments in which the payment is transferred to the player's external crypto wallet, the player can transfer their winning cryptocurrency amount to their external cryptocurrency wallet. This may include the player sharing information about their external cryptocurrency wallet with the casino via some mechanism (e.g., a QR code), etc. The casino may also be required to collect certain Know Your Customer (KYC) information from the player to perform the transfer, including, but not limited to name (first, last, etc.), birthdate, last four digits of Social Security Number (SSN), primary residence, and/or the purpose of the external cryptocurrency account, among others.

In some embodiments, a mobile device graphical user interface may be used to select whether to deposit or withdraw from the cryptocurrency wallet. A funding source may be selected to determine what the source is from among a check, cryptocurrency and credit/debit sources. Since this example illustrates the selection of cryptocurrency, the selection of which cryptocurrency is made. A bitcoin wallet address is provided to transfer the bitcoin to the bitcoin wallet. In some embodiments, the bitcoin wallet may be presented in the form of data that may be visually scanned and/or an address expressed as an alpha-numeric string that may be typed into a terminal.

The component of the system involved in the transfer, which may be a cryptocurrency exchange management service, may interact with the appropriate cryptocurrency exchange and/or blockchain directly to trigger the transfer. In some embodiments, the cryptocurrency exchange management service may require approvals from one or more administrative users to perform the transfer. Some embodiments provide that the cryptocurrency exchange management service may also maintain a log of the transaction and other historical transactions for auditing purposes. In some embodiments, the cryptocurrency exchange management service or a component of the system may also print the player a receipt containing information about their transfer. For example, the receipt may include data corresponding to the date, time, jackpot amount, conversion rate, fees, destination address, and/or the total paid by blockchain transfer, among others.

While the above example describes a physical receipt, other forms of receipts can also be used. For example, a receipt can be emailed to the player, and/or texted to the player, etc. Some embodiments provide that other information can be displayed on the receipt as the above is not exhaustive. For example, the source blockchain address may be printed, the player's name, and/or other personally identifying information may also be printed.

The casino or wide area system operator may also maintain accounts with various cryptocurrency held on various cryptocurrency exchanges so that transfers to players can have lower fees. Typically, "within the exchange" cryptocurrency transfers may not require the payment of any blockchain transfer fees and the cryptocurrency exchange management service may offer the employee who is triggering this transfer the ability to select the source cryptocurrency exchange in order to reduce transfer fees paid by the player and/or to increase the overall profit of the casino or manufacturer running the wide area progressive system.

Embodiments in which the transfer is to the crypto wallet of the player's casino resort wallet may be more suitable for smaller jackpot values. For example, some embodiments include transferring the cryptocurrency the player has won from a jackpot to their cashless wagering account. If the cashless wagering account, or resort wallet, supports holding cryptocurrency in addition to other credit types (cash, etc.), then the player's wallet can hold the amount of cryptocurrency won. This may allow the player to later convert some or all of that cryptocurrency to cash, or gain access to a line of credit equal to or less than the cash value of the cryptocurrency held in their account. The player can then also transfer their cryptocurrency funds held in their resort wallet to their external wallet on at their own leisure.

Some embodiments provide that jackpot payment may include a crypto annuity portion. In some embodiments, larger jackpot values may be awarded in either a large lump sum payment or an annuity in which payments are provided over time. Such examples may include situations in which the jackpot is a large wide area jackpot. In some embodiments, the cryptocurrency won by a player can be transferred to an on-blockchain smart contract. A jackpot smart contract can be initialized by a jackpot payment of cryptocurrency by a casino operator and/or wide area system operator when a given player wins one or more jackpots. This player's winning cryptocurrency may then be transferred to the smart contract for management by the smart contract. The smart contract may then pay out a percentage of the player's jackpot winnings on a configured basis, or as defined in a message sent to the smart contract during initialization. For example, the smart contract may have a period of 30 years, and pay out $1/30^{th}$ of the player's cryptocurrency winnings every year (ex: January $1^{st}$), to the player's configured external blockchain wallet (also as set during initialization). Some embodiments provide that the smart contract can be configured to pay out management and/or processing or other fees to other parties. For example, in the case of a wide area jackpot, the operator of the wide area jackpot system may collect 25% of the total amount of cryptocurrency available to be paid out for this period ($25\%*1/30^{th}$ of the winning amount). Other parties can also participate in the fee structure, such as the casino operator.

In some embodiments, wide area jackpots may be paid out using annuities purchased from insurance companies. For example, if the player wins a $40m jackpot, the player has the option of getting paid 50% of the total amount immediately or getting paid the $40m jackpot over 30 years using the annuity. This allows the company that runs the wide area jackpot to recognize an immediate 50% profit when the player is paid. In some embodiments, the cryptocurrency jackpot winnings act like a bond with a $1/30^{th}$ annual coupon, and the value of the coupon could appreciate each year at the rate that the underlying cryptocurrency appreciates at relative to fiat.

Some embodiments provide methods for awarding cryptocurrency jackpots to uncarded players and/or awarding fiat instead of a cryptocurrency. An uncarded player is a player without a player account and/or who is not playing using a player account, mobile app and/or who has not otherwise logged into a player loyalty system for identification.

In some embodiments, uncarded players and/or players without player accounts may win the fiat currency without the cryptocurrency pool conversions. For example, the system is running for 2 weeks and the top award is 6.0 BTC or $300,000. Over the past 2 weeks many fiat to cryptocurrency conversions have happened totaling $200,000. BTC has increased over the past 2 weeks so the prize pool is $300,000 worth of dollars instead of $200,000. Uncarded players would be awarded the $200,000, while carded players would win the 6.0 BTC which is worth $300,000. In some embodiments, the player must have a certain player loyalty account status level to qualify for the cryptocurrency award such as a gold player loyalty level.

In some embodiments, the fiat award may also be given to players instead of the crypto award based on other parameters. In some embodiments, only players wagering a certain amount of money or playing a certain denomination may win the crypto award. For example, the fiat contribution might be $200,000 and the current progressive award might be $300,000. Only players wagering a maximum bet can win the crypto award of $300,000 while players at other denominations win the $200,000. Similarly, the awarding may be based on wager, denomination, triggering a game feature, playing a certain game theme, playing a certain game paytable, achieving a certain game feature, hitting a certain bonus, winning a certain game pay (such as 3 cherries), a random event of the game, a random event of the casino or system, and/or change in the crypto currency exchange rate. In some embodiments, in response to a change in the crypto currency exchange rate, the casino may choose to award the fiat because the cryptocurrency has fallen in value to an amount below the fiat conversion value.

In some embodiments, some denominations will contribute to a fiat pool, while other denominations of the same game contribute to the crypto pool.

While embodiments herein are described for cryptocurrencies, the embodiments may be applied to any asset that fluctuates such as stocks, options, futures, bonds, real estate, commodities, or currency exchanges.

Embodiments herein may work for casino games, video lottery terminal games, social casino games, mobile casino games and sports wagering terminals that offer progressive or mystery awards.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks. The flowchart and block diagrams in the figures illustrate the architecture, functionality, and operation of possible implementations of systems, methods, and computer program products according to various aspects of the present disclosure. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be designated as "/". Like reference numbers signify like elements throughout the description of the figures.

In some embodiments, a device, apparatus, system and/or computer program product may be described as causing a result and/or action. In such embodiments, causing may include actually performing the action and/or result and/or as performing any action that causes another device, apparatus, system and/or computer program product to cause the result or action.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

What is claimed is:

1. A system comprising:

a gaming establishment component processor; and a gaming establishment component memory device which stores a plurality of instructions, which when executed by the gaming establishment component processor, cause the gaming establishment component processor to:

cause, using the gaming establishment component processor, a first currency amount of a first currency to be purchased using a second currency that is different from the first currency;

record, using the gaming establishment component processor, a second currency amount that corresponds to the first currency amount that was purchased using the second currency, wherein recording comprises generating a transaction entry that includes the second currency amount and an identifier of the first currency amount, computing a cryptographic hash value of the transaction entry using a cryptographic hash function, and adding the transaction entry and the cryptographic hash value to a data block of a blockchain after validation of the data block for inclusion using a consensus algorithm; and allocate, using the gaming establishment component processor, a first portion of the first currency amount to a gaming machine that is caused to generate a wagering game, wherein the first currency comprises a cryptocurrency that is maintained using a decentralized distributed management architecture, wherein the system further comprises a mystery jackpot controller coupled to the gaming establishment component processor, and wherein the gaming establishment component processor is further caused to:

determine a remaining amount of the first currency that is caused to generate the wagering game, after the first portion of the first currency amount has been allocated;

compare the remaining amount of the first currency to a first currency threshold;

responsive to the remaining amount of the first currency being less than the first currency threshold, determine to purchase an additional first currency amount;

cause a display device to display the first currency amount on a display portion that corresponds to a mystery jackpot;

determine a first portion of the second currency amount that corresponds to the first portion of the first currency;

configure the mystery jackpot controller with the first portion of the second currency amount and calculate, via the mystery jackpot controller, a quantity of pulls to hit value that triggers a mystery jackpot event corresponding to the first portion of the first currency; and responsive to determining that the quantity of pulls to hit value results in not satisfying a return to player metric, reconfigure the mystery jackpot controller to change the quantity of pulls to hit value to satisfy the return to player metric.

2. The system of claim 1, wherein the second currency comprises a fiat currency issued by a centralized banking system.

3. The system of claim 1, wherein the gaming establishment component processor is further caused to record a date and time corresponding to the second currency amount that corresponds to the first currency amount that was purchased using the second currency.

4. The system of claim 1, wherein the gaming establishment component processor is further caused to cause a display of a current conversion rate between the first currency and the second currency.

5. The system of claim 1, wherein the gaming establishment component processor is further caused to allocate a second portion of the first currency amount to the gaming machine and to provide a symbol driven jackpot at the gaming machine, wherein a win corresponding to the symbol driven jackpot comprises the first portion of the first currency amount and is provided in the cryptocurrency.

6. The system of claim 5, wherein the gaming establishment component processor is further caused to:

determine a second portion of the second currency amount that corresponds to the second portion of the first currency; and determine a symbol combination that corresponds to a win of the symbol driven jackpot.

7. The system of claim 6, wherein the gaming establishment component processor caused to determine a plurality of symbol combinations that cause the win of the symbol driven jackpot.

8. The system of claim 1, wherein the gaming machine comprises a mobile device that comprises a display that displays the first portion of the first currency amount to the mobile device that is caused to generate the wagering game.

9. The system of claim 8, wherein the display is further caused to display the second currency amount that corresponds to the first currency amount that was purchased using the second currency.

10. A method comprising:

causing a first currency amount of a first currency to be purchased using a second currency that is different from the first currency, the first currency comprising a cryptocurrency that is maintained using a decentralized distributed management architecture;

recording a second currency amount that corresponds to the first currency amount that was purchased using the second currency, wherein recording comprises generating a transaction entry that includes the second currency amount and an identifier of the first currency amount, computing a cryptographic hash value of the transaction entry using a cryptographic hash function, and adding the transaction entry and the cryptographic hash value to a data block of a blockchain after validation of the data block for inclusion using a consensus algorithm;

allocating a first portion of the first currency amount to a gaming machine that is caused to generate a wagering game;

determining a remaining amount of the first currency after the first portion of the first currency amount has been allocated;

comparing the remaining amount of the first currency to a first currency threshold;

responsive to the remaining amount of the first currency being less than the first currency threshold, determining to purchase an additional first currency amount;

displaying the first currency amount on a display portion that corresponds to a mystery jackpot;

determining a first portion of the second currency amount that corresponds to the first portion of the first currency;

configuring a mystery jackpot controller with the first portion of the second currency amount and calculating, via the mystery jackpot controller, a quantity of pulls to hit value that triggers a mystery jackpot event corresponding to the first portion of the first currency; and responsive to determining that the quantity of pulls to hit value results in not satisfying a return to player metric, reconfiguring the mystery jackpot controller to change the quantity of pulls to hit value to satisfy the return to player metric.

11. The method of claim 10, further comprising displaying a current conversion rate between the first currency and the second currency.

12. A gaming device comprising:

a communication interface;

a mystery jackpot controller;

a processor circuit; and a memory coupled to the processor circuit, the memory comprising machine readable instructions that, when executed by the processor circuit, cause the processor circuit to:

cause a first currency amount of a first currency to be purchased using a second currency that is different from the first currency;

record a second currency amount that corresponds to the first currency amount that was purchased using the second currency, wherein recording comprises generating a transaction entry that includes the second currency amount and an identifier of the first currency amount, computing a cryptographic hash value of the transaction entry using a cryptographic hash function, and adding the transaction entry and the cryptographic hash value to a data block of a blockchain after validation of the data block for inclusion using a consensus algorithm;

allocate a first portion of the first currency amount to a wagering game executed by the gaming device;

provide a mystery jackpot at the gaming device, wherein a win corresponding to the mystery jackpot comprises the first portion of the first currency amount and is provided in a cryptocurrency;

determine a first portion of the second currency amount that corresponds to the first portion of the first currency;

display the first currency amount on a display portion that corresponds to a symbol the mystery jackpot;

configure a mystery jackpot controller with the first portion of the second currency amount and calculate, via the mystery jackpot controller, a quantity of pulls-to-hit value that triggers a mystery jackpot event corresponding to the first portion of the first currency; and responsive to determining that the quantity of pulls to hit value results in not satisfying a return to player metric, reconfiguring the mystery jackpot controller to change the quantity of pulls to hit value to satisfy the return to player metric.

* * * * *